(12) United States Patent
Takada et al.

(10) Patent No.: US 9,142,972 B2
(45) Date of Patent: *Sep. 22, 2015

(54) POWER RECEPTION EQUIPMENT FOR RESONANCE-TYPE NON-CONTACT POWER SUPPLY SYSTEM

(75) Inventors: Kazuyoshi Takada, Kariya (JP); Sadanori Suzuki, Kariya (JP); Shimpei Sakoda, Kariya (JP); Yukihiro Yamamoto, Kiriya (JP); Shinji Ichikawa, Toyota (JP); Toru Nakamura, Toyota (JP)

(73) Assignees: Kabushiki Kaisha Toyota Jidoshokki (JP); Toyota Jidosha Kabushiki Kaisha (JP)

( * ) Notice: Subject to any disclaimer, the term of this patent is extended or adjusted under 35 U.S.C. 154(b) by 414 days.

This patent is subject to a terminal disclaimer.

(21) Appl. No.: 13/697,677

(22) PCT Filed: May 12, 2011

(86) PCT No.: PCT/JP2011/060941
§ 371 (c)(1),
(2), (4) Date: Nov. 13, 2012

(87) PCT Pub. No.: WO2011/142418
PCT Pub. Date: Nov. 17, 2011

(65) Prior Publication Data
US 2013/0057208 A1 Mar. 7, 2013

(30) Foreign Application Priority Data
May 14, 2010 (JP) .................................. 2010-112096

(51) Int. Cl.
*H01M 10/46* (2006.01)
*H02J 5/00* (2006.01)
(Continued)

(52) U.S. Cl.
CPC ............... *H02J 5/005* (2013.01); *B60L 11/182* (2013.01); *B60L 11/1833* (2013.01);
(Continued)

(58) Field of Classification Search
CPC ............................... H02J 7/0045; H02J 7/025
USPC ......................................... 320/107, 108, 114
See application file for complete search history.

(56) References Cited

U.S. PATENT DOCUMENTS

| 8,204,531 B2 | 6/2012 | Jin et al. |
| 2006/0071632 A1 | 4/2006 | Ghabra et al. |

(Continued)

FOREIGN PATENT DOCUMENTS

| CN | 101313634 | 11/2008 |
| CN | 201230219 | 4/2009 |

(Continued)

*Primary Examiner* — Edward Tso
(74) *Attorney, Agent, or Firm* — Baker & Hostetler LLP

(57) ABSTRACT

Power reception equipment (20) is provided with: a secondary side resonance coil (21b) which receives power from a primary side resonance coil (13b) of power supply equipment (10); and a rectifier (23) which rectifies the received power. The power reception equipment is further provided with: a secondary matching unit (22) which is provided between the secondary side resonance coil (21b) and the rectifier (23); a charger (24) to which rectified electric power is supplied; a power storage device (25) which is connected to the charger; and a control unit (26) which adjusts the secondary matching unit when the power storage device is being charged. The control unit stores, as data on a storage device (33), the relationship between the charge power from the power supply equipment during the power ascension phase and the matching status of the secondary matching unit (22) when charging. During the phase in which the power output from the supply equipment is reduced, the control unit adjusts, on the basis of the data stored in the storage device during the power ascension phase, the secondary matching unit (22) so as to reach a suitable status corresponding to the charge power.

6 Claims, 2 Drawing Sheets

(51) Int. Cl.
 *B60L 11/18* (2006.01)
 *H02J 7/02* (2006.01)

(52) U.S. Cl.
 CPC ......... *B60L 2210/10* (2013.01); *B60L 2210/30* (2013.01); *H02J 7/025* (2013.01); *Y02T 10/7005* (2013.01); *Y02T 10/7216* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(56) References Cited

U.S. PATENT DOCUMENTS

| | | |
|---|---|---|
| 2007/0103650 A1 | 5/2007 | Takagi et al. |
| 2009/0058190 A1 | 3/2009 | Tanaka |
| 2009/0066440 A1 | 3/2009 | Chan Wai Po et al. |
| 2009/0127937 A1 | 5/2009 | Widmer et al. |
| 2009/0174364 A1 | 7/2009 | Onishi et al. |
| 2010/0013320 A1 | 1/2010 | Shiozaki et al. |
| 2010/0052431 A1 | 3/2010 | Mita |
| 2010/0225271 A1 | 9/2010 | Oyobe et al. |
| 2011/0049995 A1 | 3/2011 | Hashiguchi |
| 2011/0241440 A1 | 10/2011 | Sakoda et al. |
| 2012/0176085 A1* | 7/2012 | Iida et al. ...................... 320/108 |
| 2013/0193913 A1* | 8/2013 | Takada et al. ................. 320/108 |

FOREIGN PATENT DOCUMENTS

| | | |
|---|---|---|
| EP | 2031729 A2 | 3/2009 |
| EP | 2290782 | 7/2010 |
| JP | 11-188113 | 7/1999 |
| JP | 2000-287369 | 10/2000 |
| JP | 2001-238372 | 8/2001 |
| JP | 2002-064403 | 2/2002 |
| JP | 2006-115592 | 4/2006 |
| JP | 2006-230032 | 8/2006 |
| JP | 2009-106136 | 5/2009 |
| JP | 2009-118587 | 5/2009 |
| JP | 2010-028937 | 2/2010 |
| JP | 2010-063245 | 3/2010 |
| JP | 2010-074937 | 4/2010 |
| JP | 2010-141977 | 6/2010 |
| JP | 2011-050140 | 3/2011 |
| WO | WO 2010/035321 | 4/2010 |
| WO | WO 2010/067763 | 6/2010 |
| WO | WO 2011/142417 | 11/2011 |
| WO | WO 2011/142418 | 11/2011 |
| WO | WO 2011/142419 | 11/2011 |
| WO | WO 2011/142420 | 11/2011 |

* cited by examiner

POWER RECEPTION EQUIPMENT FOR RESONANCE-TYPE NON-CONTACT POWER SUPPLY SYSTEM

CROSS-REFERENCE TO RELATED APPLICATIONS

This application is the National Stage of International Application No. PCT/JP2011/060941, filed May 12, 2011, which claims the benefit of Japanese Application No. 2010-112096, filed May 14, 2010, the disclosures of which are incorporated herein by reference in their entireties.

FIELD OF THE INVENTION

The present invention relates to power reception equipment for a resonance type non-contact power supply system. More specifically, the power reception equipment is suitably mounted and used in a movable body having an electrical storage device, into which electric power supplied from power supply equipment in a non-contact manner is charged.

BACKGROUND OF THE INVENTION

Conventionally, a charging system has been proposed that is capable of charging an electrical storage device mounted in a vehicle by wirelessly receiving charging power from a power source provided outside the vehicle through a resonance method (see Patent Document 1). The charging system of the document includes an electric vehicle and a power supply device, and the electric vehicle includes a secondary self-resonance coil (secondary-side resonance coil), a secondary coil, a rectifier and an electrical storage device. The power supply device includes a high-frequency power driver, a primary coil and a primary self-resonance coil (primary-side resonance coil). The number of turns of the secondary self-resonance coil is set on the basis of voltage of the electrical storage device, the distance between the primary self-resonance coil and the secondary self-resonance coil, and the resonant frequencies of the primary self-resonance coil and the secondary self-resonance coil. The distance between the power supply device and the vehicle varies depending upon the conditions of the vehicle (loading state, air pressure of the tires and the like), and the resulting variation in the distance between the primary self-resonance coil of the power supply device and the secondary self-resonance coil of the vehicle, which brings about a change of resonant frequencies of the primary self-resonance coil and the secondary self-resonance coil. Hence, the document discloses that a variable capacitor is connected to a conductor wire of the secondary self-resonance coil, and when the electrical storage device is charged, charging power to the electrical storage device is calculated on the basis of detection values of a voltage sensor and a current sensor. Further, the document discloses that the capacity of the variable capacitor of the secondary self-resonance coil is adjusted so that the charging power to the electrical storage device becomes the maximum, thereby adjusting LC resonant frequency of the secondary self-resonance coil.

PRIOR ART DOCUMENT

Patent Document

Patent Document 1: Japanese Laid-Open Patent Publication No. 2009-106136

SUMMARY OF THE INVENTION

Problems that the Invention is to Solve

The document discloses a method for efficiently supplying electric power from a power supply side to a power reception side even when the distance between the primary self-resonance coil and the secondary self-resonance coil varies due to the conditions of the vehicle the loading state, the air pressure of the tires and the like). That is, the document surely discloses that the capacity of the variable capacitor of the secondary self-resonance coil is adjusted such that charging power to the electrical storage device becomes the maximum when the electrical storage device is charged. According to the method of the document, however, it is necessary to keep adjusting the capacity of the variable capacitor of the secondary self-resonance coil such that the charging power becomes the maximum from the start to the completion of the charging operation, and labor is required for the adjustment.

It is an objective of the present invention to provide power reception equipment for a resonance type non-contact power supply system capable of easily adjusting a matching unit of power reception equipment so that electric power is efficiently transmitted from power supply equipment even if a state of charge of the electrical storage device varies at the time of a charging operation, and capable of efficiently charging the power reception equipment.

Means for Solving the Problems

To achieve the foregoing objective and in accordance with one aspect of the present invention, power reception equipment for a resonance type non-contact power supply system is provided that includes a secondary-side resonance coil, a rectifier, a secondary matching unit, a charger, an electrical storage device, and a control unit. The secondary-side resonance coil receives electric power from a primary-side resonance coil possessed by power supply equipment. The rectifier rectifies electric power received by the secondary-side resonance coil. The secondary matching unit is provided between the secondary-side resonance coil and the rectifier. Electric power rectified by the rectifier is supplied to the charger. The electrical storage device is connected to the charger. The control unit adjusts the secondary matching unit when the electrical storage device is being charged. The control unit is configured to store, in the charging, a relationship between charging power from the power supply equipment during a power ascension phase and a matching state of the secondary matching unit as data in a storage device. The control unit is also configured, during a phase in which power output from the power supply equipment falls, to adjust the secondary matching unit to bring the secondary matching unit into a suitable state corresponding to the charging power on the basis of the data that has been stored in the storage device during the power ascension phase.

According to the invention, when the secondary matching unit is adjusted while the electrical storage device is being charged, the control unit (control means) stores, as data on the storage device, the relationship between the charging power from the power supply equipment during the power ascension phase and the matching state of the secondary matching unit. During the phase in which the power output from the power supply equipment falls, the control unit adjusts the secondary matching unit to bring it into a suitable state corresponding to the charging power on the basis of the data stored in the storage device during the power ascension phase. Hence, during the ascension phase of the power from the power supply equipment, the control unit needs to adjust the secondary matching unit such that the impedance thereof becomes an appropriate value corresponding to charging power to the electrical storage device. During the phase in which the power output from the power supply equipment is reduced, however, the control unit adjusts the secondary matching unit on the basis of the data that is already stored in the storage device. Hence, the control unit can easily adjust the secondary matching unit into a suitable state corresponding to the charging power. Therefore, the control unit can easily adjust the secondary matching unit of the power reception equipment so that electric power is efficiently transmitted from the power supply equipment even if charging power varies at the time of a charging operation. That is, it is possible to efficiently carry out the charging operation.

DETAILED DESCRIPTION OF THE PREFERRED EMBODIMENTS

A resonance type non-contact power supply system for charging a vehicle-mounted battery according to one embodiment of the present invention will be described, with reference to FIGS. 1 and 2.

Figure 1:
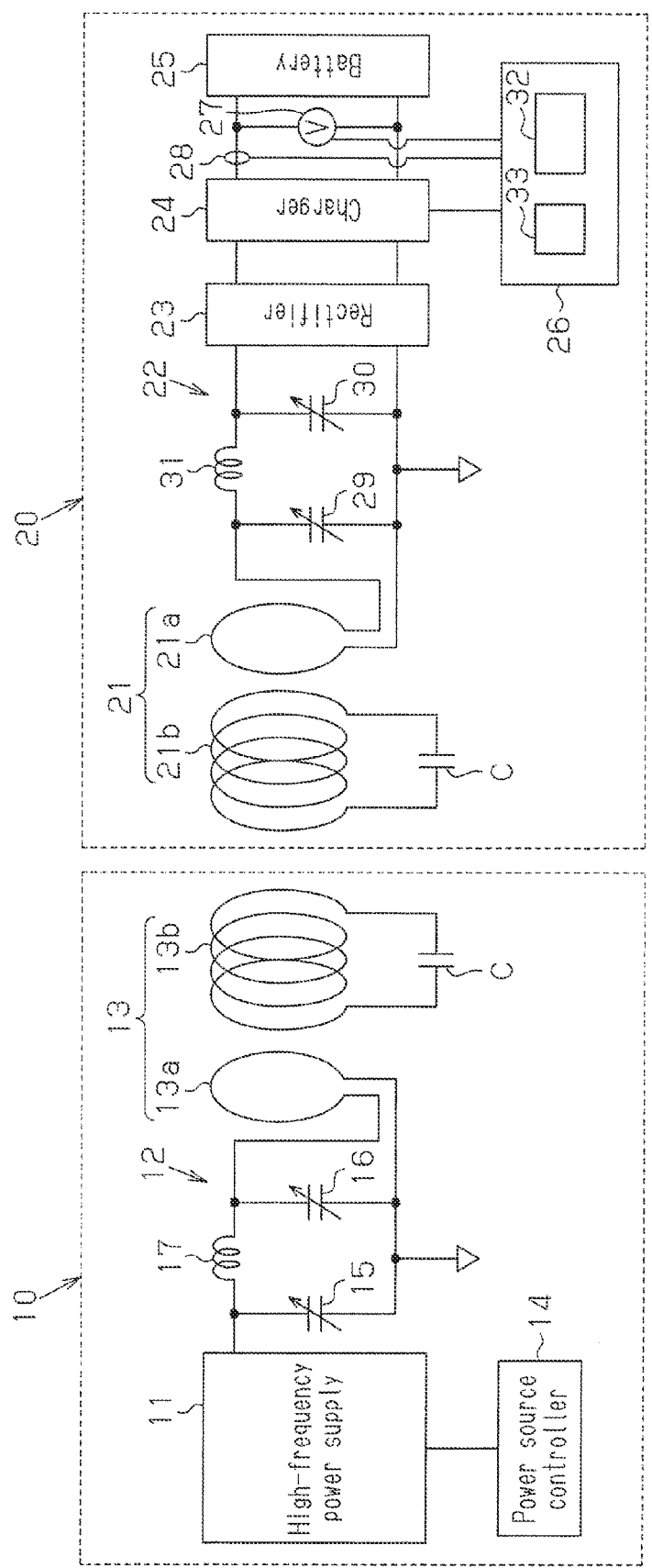
FIG. 1 is a diagram of a non-contact power supply system according to one embodiment.

As shown in FIG. 1, the resonance type non-contact power supply system includes power supply equipment 10 and movable body equipment 20. The power supply equipment 10 is power supply side equipment (power sending side equipment) provided on the ground. The movable body equipment 20 is movable body side equipment as power reception equipment mounted in a vehicle (automobile) as a movable body.

The power supply equipment 10 includes a high-frequency power source 11 as an AC power source, a primary matching unit 12, a primary coil device 13 and a power source controller 14. A power supply ON/OFF signal is sent to the high-frequency power source 11 from the power source controller 14 as a power source controller, and the high-frequency power source 11 is turned ON and OFF by this signal. The high-frequency power source 11 outputs AC electric power of frequency that is equal to preset resonant frequency of a resonance system, e.g., high-frequency electric power of about several MHz.

The primary coil device 13 as a primary-side coil includes a primary coil 13a and a primary-side resonance coil 13b. The primary coil 13a is connected to the high-frequency power source 11 through the primary matching unit 12. The primary coil 13a and the primary-side resonance coil 13b are arranged coaxially, and a capacitor C is connected to the primary-side resonance coil 13b in parallel. The primary coil 13a is coupled to the primary-side resonance coil 13b by electromagnetic induction, and AC electric power supplied from the high-frequency power source 11 to the primary coil 13a is supplied to the primary-side resonance coil 13b by electromagnetic induction.

The primary matching unit 12 as a primary-side matching unit includes two primary variable capacitors 15 and 16 as variable reactances and a primary inductor 17. One of the primary variable capacitors, or the primary variable capacitor 15, is connected to the high-frequency power source 11, and the other primary variable capacitor 16 is connected to the primary coil 13a in parallel. The primary inductor 17 is connected between the primary variable capacitors 15 and 16. By changing capacities of the primary variable capacitors 15 and 16, the impedance of the primary matching unit 12 is changed. Each of the primary variable capacitors 15 and 16 is of known configuration having a rotary shaft (not shown), which is driven by a motor, for example. If the motor is driven by a drive signal from the power source controller 14, the capacities of the primary variable capacitors 15 and 16 are each changed.

The movable body equipment 20 includes a secondary coil device 21, a secondary matching unit 22, a rectifier 23, a charger 24, a battery 25 and a vehicle-mounted controller 26. The battery 25 is an electrical storage device, which is connected to the charger 24. The movable body equipment 20 includes a voltage sensor 27, which detects voltage of the battery 25, and a current sensor 28, which detects current flowing from the rectifier 23 to the charger 24. The vehicle-mounted controller 26 as a vehicle side controller functions as control means (control unit), which calculates charging power to the battery 25 on the basis of detection signals of the voltage sensor 27 and the current sensor 28. The charger 24 includes a DC/DC converter (not shown), which converts DC rectified by the rectifier 23 into voltage suitable for charging the battery 25. The vehicle-mounted controller 26 controls a switching device of the DC/DC converter of the charger 24 when the battery 25 is charged.

The secondary coil device 21 as a secondary-side coil includes a secondary coil 21a and a secondary-side resonance coil 21b. The secondary coil 21a and the secondary-side resonance coil 21b are arranged coaxially, and another capacitor C, which is different from that of the primary-side resonance coil 13b, is connected to the secondary-side resonance coil 21b. The secondary coil 21a is coupled to the secondary-side resonance coil 21b by electromagnetic induction, and AC electric power supplied from the primary-side resonance coil 13b to the secondary-side resonance coil 21b by resonance is supplied to the secondary coil 21a by electromagnetic induction. The secondary coil 21a is connected to the secondary matching unit 22.

The number of turns and winding diameters of the primary coil 13a, the primary-side resonance coil 13b, the secondary-side resonance coil 21b and the secondary coil 21a are appropriately set corresponding to the magnitude of electric power to be supplied (transmitted) from the power supply equipment 10 to the movable body equipment 20.

In this embodiment, the primary matching unit 12, the primary coil 13a, the primary-side resonance coil 13b, the secondary-side resonance coil 21b, the secondary coil 21a, the secondary matching unit 22, the rectifier 23, the charger 24 and the battery 25 constitute the resonance system.

The secondary matching unit 22 as a secondary-side matching unit includes two secondary variable capacitors 29 and 30 as variable reactances and a secondary inductor 31. The secondary inductor 31 is connected between the secondary variable capacitors 29 and 30. One of the secondary variable capacitors 29, 30, or the secondary variable capacitor 29, is connected to the secondary coil 21a in parallel, and the other secondary variable capacitor 30 is connected to the rectifier By changing capacities of the secondary variable capacitors 29 and 30, the impedance of the secondary matching unit 22 is changed. Each of the secondary variable capacitors 29 and 30 is of known configuration having a rotary shaft (not shown), which is driven by a motor, for example. If the motor is driven by a drive signal from the vehicle-mounted controller 26, the capacities of the secondary variable capacitors 29 and 30 are each changed.

The vehicle-mounted controller 26 as the vehicle side controller includes a vehicle-mounted CPU 32 and a vehicle-mounted storage device (memory) 33. The vehicle-mounted storage device 33 stores control programs for adjusting the secondary matching unit 22 by the vehicle-mounted controller 26 when the battery 25 is charged. When the battery 25 is charged, the vehicle-mounted controller 26 stores, as data on the vehicle-mounted storage device 33, a relationship between the charging power from the power supply equipment 10 during a power ascension phase and a matching state of the secondary matching unit 22 in accordance with the control program. During the phase in which power output from the power supply equipment 10 is reduced, the vehicle-mounted controller 26 adjusts the secondary matching unit 22 to bring it into a suitable state corresponding to the charging power on the basis of the data stored in the vehicle-mounted storage device 33 during the power ascension phase. More specifically, the vehicle-mounted controller 26 adjusts the secondary variable capacitors 29 and 30 so that the secondary matching unit 22 is brought into a suitable state corresponding to the charging power.

Next, operation of the resonance type non-contact power supply system configured as described above will be described.

When the battery 25 mounted in a vehicle is to be charged, the vehicle is stopped at a predetermined stop-for-charging position of the power supply equipment 10. After the vehicle is stopped at the predetermined stop-for-charging position, the vehicle-mounted controller 26 sends a power supply request signal to the power source controller 14. If the power source controller 14 receives the power supply request signal, power supply is started. If AC voltage of resonant frequency is applied from the high-frequency power source 11 of the power supply equipment 10 to the primary coil 13a, electric power is supplied from the primary-side resonance coil 13b to the secondary-side resonance coil 21b in a non-contact resonance manner. The electric power received by the secondary-side resonance coil 21b is supplied to the charger 24 through the secondary matching unit 22 and the rectifier 23, and the battery 25 connected to the charger 24 is charged.

When the battery 25 mounted in a vehicle is to be charged, the vehicle is not always precisely stopped at the charging position where power supply is efficiently carried out between the power supply equipment 10 and the movable body equipment 20 in the non-contact manner. Hence, the primary matching unit 12 and the secondary matching unit 22 are adjusted prior to the charging operation in some cases.

Electric power supplied (fed) from the power supply equipment 10 to the movable body equipment 20 in a non-contact manner, i.e., charging power is not constant, and charging power varies depending upon the state of charge (SOC) of the battery 25. Further, even if the distance between the primary-side resonance coil 13b and the secondary-side resonance coil 21b is suitable for efficiently transmitting electric power from the power supply equipment 10 to the movable body equipment 20, there is a possibility that the battery 25 is in a state of charge where the charging operation of the battery 25 cannot be continued in an efficient state if the impedance of the secondary matching unit 22 is not adjusted to a suitable value corresponding to the charging power.

When the battery 25 is charged efficiently, variation in output electric power that is output from the power supply equipment 10 from the start to the completion of the charging operation corresponds to variation in charging power to the battery 25. That is, in an initial stage of the charging operation, charging power is increased to a maximum value in a state in which variation of the charging power is great as shown in FIG. 2. Thereafter, when the charging power is reduced, it is gradually reduced in a state in which a variation rate is smaller than that when the charging power is increased. That is, the power supply equipment 10 outputs electric power such that output electric power from the high-frequency power source 11 at the time of the charging operation is increased monotonously. Thereafter, the power supply equipment 10 outputs electric power such that it is reduced monotonously until the charging operation is completed. In the example in FIG. 2, time elapsed from when the charging operation is started until charging power reaches the maximum is shorter than time elapsed from when after the charging power becomes the maximum until the charging operation is stopped.

During the phase in which power output from the power supply equipment 10 ascends during the charging operation, detection signals of the voltage sensor 27 and the current sensor 28 are input into the vehicle-mounted controller 26 at predetermined time intervals, and the vehicle-mounted controller 26 calculates charging power on the basis of the detection signals. The vehicle-mounted controller 26 adjusts the secondary variable capacitors 29 and 30, thereby adjusting the secondary matching unit 22 into the matching state in the charging power, i.e., adjusting the impedance of the secondary matching unit 22 to a suitable value. The vehicle-mounted controller 26 stores, as data on the vehicle-mounted storage device 33, a relationship between the charging power and the matching state of the secondary matching unit 22. For example, the vehicle-mounted controller 26 stores, as data on the vehicle-mounted storage device 33, a relationship between the charging power and capacities of the secondary variable capacitors 29 and 30.

During the phase in which power output from the power supply equipment 10 is reduced, i.e., during the phase in which charging power is reduced, the vehicle-mounted controller 26 adjusts the secondary matching unit 22 (secondary variable capacitors 29 and 30) so that the secondary matching unit 22 is brought into a suitable state corresponding to the charging power on the basis of the data stored in the vehicle-mounted storage device 33 during the power ascension phase. More specifically, as suitable capacities of the secondary variable capacitors 29 and 30 corresponding to the charging power at some point in time in a charging power reducing phase, the vehicle-mounted controller 26 employs suitable capacities of the secondary variable capacitors 29 and 30 corresponding to the same charging power as that in a charging power ascension phase. For example, as capacities of the suitable secondary variable capacitors 29 and 30 with respect to charging power at a point B in the charging power reducing phase, the vehicle-mounted controller 26 employs suitable capacities of the secondary variable capacitors 29 and 30 with respect to charging power at a point A in the charging power ascension phase shown in FIG. 2 for example. Therefore, in the charging power reducing phase, the vehicle-mounted controller 26 calculates charging power from detection signals of the voltage sensor 27 and current sensor 28 at predetermined time intervals, and adjusts the capacities of the secondary variable capacitors 29 and 30 so that the capacities become equal to values corresponding to the calculated charging power. Hence, during the phase in which the power from the power supply equipment 10 ascends, the vehicle-mounted controller 26 needs to adjust the secondary matching unit 22 such that the impedance of the secondary matching unit 22 becomes a suitable value corresponding to the charging power, but during the phase in which power output from the power supply equipment 10 is reduced, the vehicle-mounted controller 26 adjusts the secondary matching unit 22 on the basis of the data stored in the vehicle-mounted storage device 33. Hence, it is possible to easily adjust the secondary matching unit 22 into a suitable state corresponding to the charging power. By adjusting the secondary matching unit 22 in this manner, the power supply equipment 10 can efficiently transmit the electric power.

The vehicle-mounted controller 26 determines that the charging operation is completed on the basis of time elapsed form when voltage of the battery 25 becomes equal to predetermined voltage. If the charging operation of the battery 25 is completed, the vehicle-mounted controller 26 sends a charging operation completion signal to the power source controller 14. If the power source controller 14 receives the charging operation completion signal, the transmission of electric power is completed.

The present embodiment has the following disadvantages.

(1) The movable body equipment 20, which is power reception equipment for a resonance type non-contact power supply system, includes the secondary-side resonance coil 21b, which receives electric power from the primary-side resonance coil 13b of the power supply equipment 10, the rectifier 23, which rectifies electric power received by the secondary-side resonance coil 21b, and the secondary matching unit 22, which is provided between the secondary-side resonance coil 21b and the rectifier 23. The movable body equipment 20 further includes the charger 24, to which electric power rectified by the rectifier 23 is supplied, the battery 25, which is connected to the charger 24, and the vehicle-mounted controller 26, which adjusts the secondary matching unit 22 when the battery 25 is charged. The vehicle-mounted controller 26 stores, as data on the vehicle-mounted storage device 33, the relationship between charging power during the phase in which power output from the power supply equipment 10 ascends when the battery 25 is charged and the matching state of the secondary matching unit 22. During the phase in which power output from the power supply equipment 10 is reduced, the vehicle-mounted controller 26 adjusts the secondary matching unit 22 to bring it into the suitable state corresponding to the charging power on the basis of the data stored in the vehicle-mounted storage device 33 during the power ascension phase. Therefore, according to the embodiment, even if the state of charge of the battery 25 varies when it is charged, it is possible to easily adjust the secondary matching unit 22 of the power reception equipment such that electric power is efficiently transmitted from the power supply equipment 10 and thus, the charging operation can be carried out efficiently.

(2) The power supply equipment 10 outputs electric power from the high-frequency power source 11 at the time of the charging operation such that the electric power is monotonously increased and thereafter, the power supply equipment 10 outputs electric power such that it is monotonously reduced until the charging operation is completed, and such that time elapsed from when the charging operation is started until the output electric power reaches the maximum is shorter than time elapsed from when the output electric power becomes the maximum until the charging operation is stopped. Therefore, according to the embodiment, it is possible to shorten time required for adjusting the secondary matching unit 22 as compared with a case where time elapsed until the output electric power reaches the maximum after the charging operation is started is longer than time elapsed from when the output electric power becomes the maximum until the charging operation is stopped.

(3) A π-type matching unit, which includes the two secondary variable capacitors 29 and 30 and the one secondary inductor 31, is used as the secondary matching unit 22. Therefore, the impedance of the secondary matching unit 22 can be adjusted to a great extent by adjusting one of the variable capacitors (e.g., secondary variable capacitor 29), and the impedance of the secondary matching unit 22 can be finely adjusted by adjusting the other variable capacitor (e.g., secondary variable capacitor 30). That is, it is possible to easily adjust the impedance of the secondary matching unit 22, (4) The power supply equipment 10 is provided with the primary matching unit 12. When the battery 25 is to be charged for example, the vehicle is not always precisely stopped at the charging position, where power supply is efficiently carried out between the power supply equipment 10 and the movable body equipment 20 in the non-contact manner. According to the embodiment, however, by adjusting the primary matching unit 12 and the secondary matching unit 22 prior to the charging operation, it is easy to transmit electric power efficiently from the power supply equipment 10 without the need to change the power frequency of the high-frequency power source 11.

(5) The movable body equipment 20 is mounted in a vehicle (automobile), and the power supply equipment 10 is provided with the primary matching unit 12. Even when the vehicle is stopped at the predetermined stop-for-charging position of the power supply equipment 10, depending upon the conditions of the vehicle (loading state, air pressure of the tire and the like), the distance between the primary-side resonance coil 13b and the secondary-side resonance coil 21b becomes different, in some cases, from a value which is preset so that electric power is efficiently transmitted from the power supply equipment 10. That is, the resonant frequency is deviated in some cases. According to the embodiment, however, since the power supply equipment 10 is provided with the primary matching unit 12, it is possible to easily and efficiently transmit electric power from the power supply equipment 10 in accordance with the vehicle conditions by adjusting the primary matching unit 12 without the need to move the vehicle.

The embodiment is not limited to those described above, and the embodiment may be embodied as follows, for example.

The vehicle-mounted controller 26 does not necessarily need to store, as data on the storage device, the relationship between the charging power during the phase, in which power output from the power supply equipment 10 at the time of one charging operation is ascended and the matching state of the secondary matching unit 22. That is, the vehicle-mounted controller 26 may store, on the vehicle-mounted storage device 33, the data when a plurality of charging operations are carried out, and may average the data and use the averaged data. For example, the vehicle-mounted controller 26 may acquire the matching state of the secondary matching unit 22 by using data obtained by averaging current data and past data sets of predetermined times.

Figure 2:
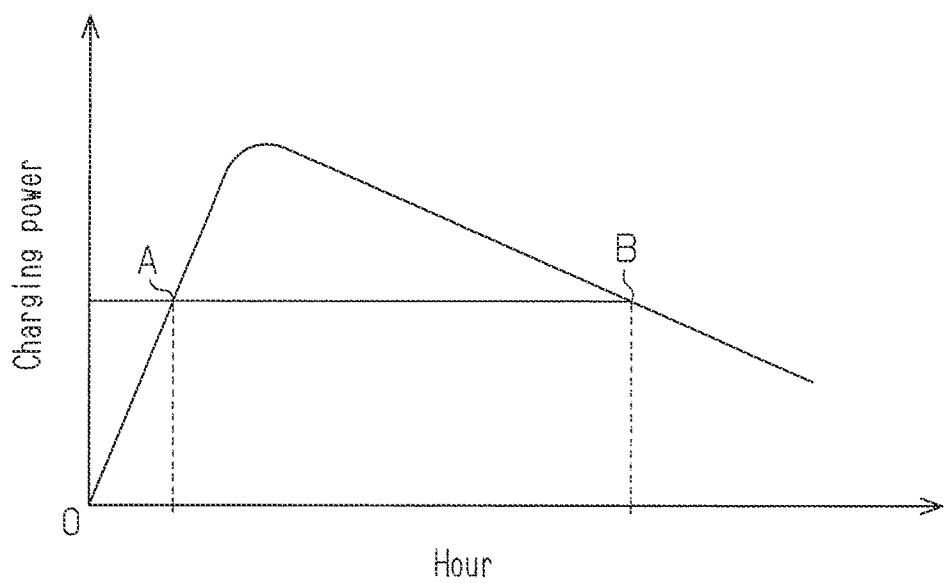
FIG. 2 is a graph showing changes over time of charging power when the battery shown in FIG. 1 is charged.

As shown in FIG. 2, the output state of electric power from the high-frequency power source 11 at the time of the charging operation is not limited to the state in which electric power is output while increasing it monotonously and thereafter electric power is output while reducing it monotonously until the charging operation is completed. For example, a state in which electric power is constant or a state in which electric power is once reduced and then it is again increased may exist before the electric power becomes the maximum.

Contrary to FIG. 2, the output state of electric power from the high-frequency power source 11 when the charging operation is carried out may be a state in which electric power is output such that time elapsed from when the charging operation is started until the output electric power reaches the maximum is longer than time elapsed from when the output electric power becomes the maximum until the charging operation is stopped.

The vehicle-mounted controller 26 may store, on the vehicle-mounted storage device 33, data indicative of a relationship between a state of charge (SOC) of the battery 25 in a state in which the distance between the primary-side resonance coil 13b and the secondary-side resonance coil 21b is preset and a suitable impedance of the secondary matching unit 22 corresponding to such a state of charge. In this case, the vehicle-mounted controller 26 checks the state of charge of the battery 25 from a detection signal of the voltage sensor 27 at the time of a charging operation, and adjusts the secondary matching unit 22 on the basis of an impedance corresponding to the state of charge. In this case, it is possible to adjust the secondary matching unit 22 within a short time as compared with a case where the vehicle-mounted controller 26 does not check the state of charge of the battery 25 and adjusts the secondary matching unit 22.

The vehicle-mounted controller 26 does not necessarily need to check the state of charge of the battery 25 from the detection signal of the voltage sensor 27. For example, the vehicle-mounted controller 26 may detect and integrate discharge voltage and a discharge current amount at the time of a charging operation after the battery 25 is charged, thereby detecting the state of charge of the battery 25 when the charging operation is started. In this case, it is possible to precisely detect the state of charge of the battery 25 as compared with a case where the state of charge is detected from voltage of the battery 25, for example.

Not all of the primary coil 13a, the primary-side resonance coil 13b, the secondary coil 21a and the secondary-side resonance coil 21b are absolutely necessary to allow the resonance type non-contact power supply system to supply electric power between the power supply equipment 10 and the movable body equipment 20 in the non-contact manner. That is, it is only necessary that the resonance type non-contact power supply system include at least the primary-side resonance coil 13b and the secondary-side resonance coil 21b. That is, instead of forming the primary coil device 13 from the primary coil 13a and the primary-side resonance coil 13b, it is possible to omit the primary coil 13a, and the primary-side resonance coil 13b may be connected to the high-frequency power source 11 through the primary matching unit 12. Alternatively, instead of forming the secondary coil device 21 from the secondary coil 21a and the secondary-side resonance coil 21b, it is possible to omit the secondary coil 21a, and the secondary-side resonance coil 21b may be connected to the rectifier 23 through the secondary matching unit 22. However, if the resonance type non-contact power supply system includes all of the primary coil 13a, the primary-side resonance coil 13b, the secondary coil 21a and the secondary-side resonance coil 21b, it is easy to adjust the resonance type non-contact power supply system in the resonance state. Further, even if the distance between the primary-side resonance coil 13b and the secondary-side resonance coil 21b becomes great, it is easy to maintain the resonance state.

A vehicle as the movable body means a vehicle including an electric motor that generates a travelling drive force, i.e., an electric vehicle. That is, examples of vehicles to which the present invention is applied are an electric automobile, a hybrid vehicle, in which an internal combustion engine is further mounted together with an electric motor as power sources, and a vehicle in which an electrical storage device and a fuel battery are mounted as DC power supplies for driving the vehicle. The vehicle is not limited to one requiring a driver, and the vehicle may be an unmanned carrier.

The movable body is not limited to a vehicle. That is, the present invention may be applied to any type of movable body as long as the movable body can move away from the power supply equipment when the movable body is not charged. That is, the movable body may be a robot, for example.

Each of the primary matching unit 12 and the secondary matching unit 22 is not limited to the configuration having two variable capacitors and an inductor, and may have a variable inductor as the inductor. Each of the primary matching unit 12 and the secondary matching unit 22 may have a variable inductor and two non-variable capacitors.

The primary matching unit 12 and the secondary matching unit 22 are not limited to the π-type matching units, and they may be T-type or L-type matching units.

The high-frequency power source 11 may be configured to be capable of or incapable of changing the frequency of power AC voltage.

The primary matching unit 12 of the power supply equipment 10 may be omitted. However, if the primary matching unit 12 is omitted, in order to efficiently supply electric power from the power supply side to the power reception side, it is necessary to precisely stop the movable body at the predetermined stop-for-charging position, so that the distance between the primary-side resonance coil 13b and the secondary-side resonance coil 21b becomes equal to the preset value.

It is only necessary that the electrical storage device be a DC power supply that can be charged and discharged. That is, the electrical storage device is not limited to the battery (secondary battery) 25, and may be a large-capacity capacitor for example.

Coil axes of the primary coil 13a, the primary-side resonance coil 13b, the secondary-side resonance coil 21b and the secondary coil 21a need not extend in the horizontal direction or the vertical direction. The coil axes of these coils may extend diagonally with respect to the horizontal direction, for example.

The charger 24 does not need to be provided with a booster circuit. That is, the battery 25 may be charged only by rectifying, by the rectifier 23, AC current that is output from the secondary coil device 21.

The capacitors C, which are respectively connected to the primary-side resonance coil 13b and the secondary-side resonance coil 21b, may be omitted. However, if the capacitors C are respectively connected to the primary-side resonance coil 13b and the secondary-side resonance coil 21b, resonant frequency can be lowered as compared with a case where the capacitors C are omitted. If the resonant frequency is the same, the primary-side resonance coil 13b and the secondary-side resonance coil 21b can be made compact if the capacitors C are respectively connected to the primary-side resonance coil 13b and the secondary-side resonance coil 21b as compared with the case where the capacitors C are omitted.

All of the diameters of the primary coil 13a, the primary-side resonance coil 13b, the secondary-side resonance coil 21b and the secondary coil 21a need not be made in the same diameter. For example, diameters of the primary-side resonance coil 13b and the secondary-side resonance coil 21b may be made in the same diameter, and diameters of the primary coil 13a and the secondary coil 21a may be different from those of the primary-side resonance coil 13b and the secondary-side resonance coil 21b.

The invention claimed is:

1. Power reception equipment for a resonance type non-contact power supply system, the power reception equipment comprising:

a secondary-side resonance coil, which receives electric power from a primary-side resonance coil possessed by power supply equipment;
a rectifier, which rectifies electric power received by the secondary-side resonance coil;
a secondary matching unit provided between the secondary-side resonance coil and the rectifier;
a charger, to which electric power rectified by the rectifier is supplied;
an electrical storage device connected to the charger; and
a control unit, which adjusts the secondary matching unit when the electrical storage device is being charged, wherein
the control unit is configured to store, in the charging, a relationship between charging power from the power supply equipment during a power ascension phase and a matching state of the secondary matching unit as data in a storage device, and
the control unit is also configured, during a phase in which power output from the power supply equipment falls, to adjust the secondary matching unit to bring the secondary matching unit into a suitable state corresponding to the charging power on the basis of the data that has been stored in the storage device during the power ascension phase.

2. The power reception equipment according to claim 1, wherein the power reception equipment is mounted in a movable body and is used.

3. The power reception equipment according to claim 2, wherein the movable body is an electric vehicle.

4. A resonance type non-contact power supply system comprising the power reception equipment according to claim 1, and power supply equipment,
wherein the power supply equipment is configured to output electric power such that output power from the high-frequency power supply is monotonously increased at the time of the charging operation and the electric power is then monotonously reduced until the charging operation is completed and such that time elapsed from when the charging operation is started until output power reaches a maximum is shorter than time elapsed from when the output power becomes the maximum until the charging operation is stopped.

5. The power reception equipment according to claim 1, wherein the storage device stores data indicative of a relationship between a state of the electrical storage device in which a distance between the primary-side resonance coil and the secondary-side resonance coil is preset and a suitable impedance of the secondary matching unit that corresponds to the state of the electrical storage device.

6. The power reception equipment according to claim 1, wherein the secondary matching unit is a π-type matching unit comprising two variable capacitors and one inductor.

* * * * *